UNITED STATES PATENT OFFICE.

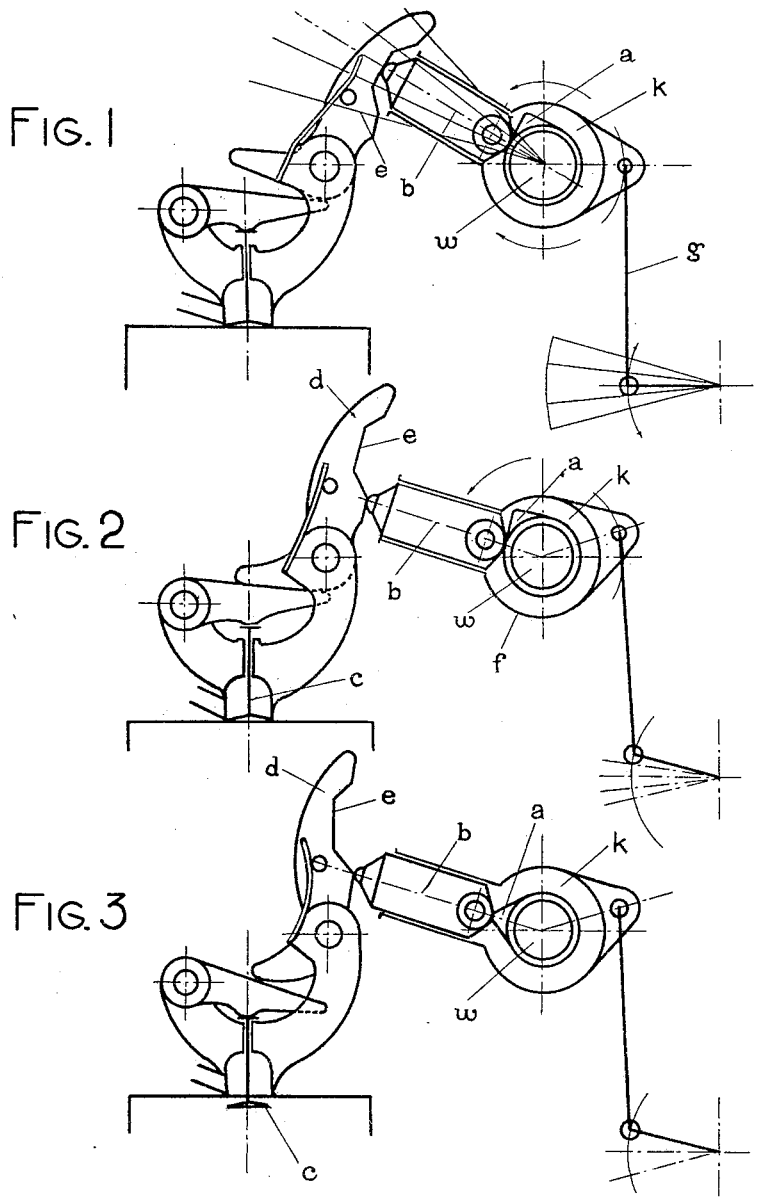

PAOLO KIND, OF TURIN, ITALY.

DEVICE FOR PRODUCING ALTERATIONS IN THE MOVEMENTS OF VALVES.

1,107,963.   Specification of Letters Patent.   Patented Aug. 18, 1914.

Application filed December 30, 1911. Serial No. 668,687.

*To all whom it may concern:*

Be it known that I, PAOLO KIND, of Turin, Italy, have invented certain new and useful Improvements in Devices for Producing Alterations in the Movements of Valves, of which the following is a full, clear, and exact description.

The invention relates to that class of devices for producing alterations in the times of movement of distributing valves in power engines in which the valves for controlling the introduction and exhaust of the motive agent are actuated from a distributing shaft by means of a cam or eccentric and the object of the invention is to provide a novel mechanism for this purpose, arranged between the cam and the valve to be controlled.

The present invention consists in employing with a member which acts upon the valve, and which has a curved contact surface, of a second member adapted to be displaced on the periphery of a cam or eccentric on a distributing shaft, and which by contact with different portions of the contact surface of the first member causes the latter to assume different positions which correspond to alterations, suspensions and reversing of the opening phases of the distributing valve.

A practical embodiment of the invention is illustrated in the accompanying drawings forming a part of this specification in which—

Figure 1 is a diagrammatic view showing the invention as applied to the valve of an engine; Fig. 2 is a similar view, the parts being shown in a different position; and, Fig. 3 is a similar view showing the device actuated by the cam to open the valve.

A distributing shaft $w$ is employed which is driven from the engine, the valves of which are to be controlled, the distributing shaft being provided with a cam $a$ adapted to act upon the intermediate member $b$. A supporting member $f$ is preferably mounted to turn on a fixed support surrounding the distributing shaft, and is provided with a guide or housing in which the intermediate member $b$ is adapted to reciprocate. The member $f$ may, however, if desired, be mounted directly on the distributing shaft $w$. A spring pressed member $d$ is pivoted on a support and has a contact surface $e$ formed with a cavity or depression and projecting portions at the ends of the cavity. The member $d$ is held by its spring with its contact surface in engagement with the end of the intermediate member $b$.

In the drawing a pivoted member is shown engaging the stem of the valve to be controlled, and the member $d$ has an arm adapted to engage said pivoted member to move the valve to open the same. The valve is normally held closed by a spring (not shown). It will be readily understood that by the mechanism shown, the transmission of motion from a rotating cam to the valve stem of an engine can be effected, altered and interrupted as desired. By adjusting the supporting member $f$ the intermediate member $b$ may be caused to contact with different portions of the contact surface $e$. As the member $b$ contacts with more or less projecting portions of the contact surface, the member $d$ is moved more or less by the cam stroke and a greater or less duration of the time of valve opening is produced, and moreover by the displacement of the member $b$ on the periphery of the cam or eccentric different modifications of the distributing phases are produced. The reversing operation of the distributing means takes place in a similar manner.

If the supporting member $f$ is placed in the central or stop position, (Fig. 1.) then the intermediate member $b$ comes in contact with the cavity or depressed portion of the contact surface $e$, so that the valve stem cannot be acted upon even though the cam $a$ of the distributing shaft acts upon the intermediate member $b$. If the supporting member $f$ is turned so that the intermediate member $b$ comes in contact with a projecting portion of the surface $e$, the valve stem will be acted upon when the cam $a$ acts upon the intermediate member $b$. If the supporting member $f$ be rotated further in the same direction, then by a corresponding shape of the contact surface an increase or a diminution in the admission duration, as well as an increase or a diminution in the time of starting the admission are obtained. If the supporting member $f$ is rotated in another direction from the central or stop position, then the corresponding distributing phase takes place for the inverted engine action.

In case of distributing devices with a large angle of work, as for instance, the admission and exhaust valves of four-cycle combustion engines and the inlet valves, of all kinds of combustion engines, in order to avoid by reversal a too great displacement of the supporting member $f$, which would hinder the transmission of motion, it is necessary to reduce the speed of rotation of the distributing shaft, for two-stroke engines, for instance, $\frac{1}{2}$, $\frac{1}{3}$; for four-stroke engines $\frac{1}{4}$, $\frac{1}{6}$; and to provide a suitable corresponding number of cams on the distributing shaft. The shape of the contact surface may be varied, and the profile of the cam may also be suitably modified according to the desired alterations in the movements of the valves. The supporting member $f$ can be adjusted on its support and held in the various positions by means of a rod $g$ or other suitable means, and when more than one device is employed they can be connected by means of tie or rotating rods, suitably jointed together. The intermediate piece $b$ is provided with a roller or ball at the end which bears upon the contact surface $e$.

What I claim is:

1. In a device of the character described, the combination with a distributing valve, a distributing shaft provided with a cam, a pivoted member provided with a contact surface, and means for acting on said valve from the contact member, of a supporting member, and a reciprocating member having guided movement in said supporting member and moved by said cam, the said reciprocating member being arranged between the contact surface of said pivoted member and the circumference of said cam, the said supporting member being adjustable around said shaft to cause the reciprocating member to engage a different portion of the said contact surface.

2. In a device of the character described, the combination with a distributing valve, of a pivoted member adapted to act on said valve and having a contact surface, an intermediate reciprocating member engaging said contact surface, a distributing shaft provided with a cam for moving said reciprocating member, a fixed support surrounding the distributing shaft, and a supporting member having a guideway for the reciprocating member, the said supporting member being mounted to turn on said fixed support to cause the reciprocating member to engage different portions of the said contact surface, thereby causing a difference in movement of the said pivoted member and a corresponding alteration in the action of said valve.

3. In a device of the character described, the combination with a valve, of a shaft provided with a cam, a supporting member mounted to turn around the shaft, a member mounted to reciprocate in said supporting member, a pivoted contact member having a contact surface, a spring bearing on said contact member to hold the same with the contact surface in engagement with the end of the reciprocating member, means for moving the supporting member around the said shaft to cause the reciprocating member to engage different portions of the said contact surface, an arm on the said contact member, and means for actuating the said valve from the said arm.

4. In a device of the character described, the combination with a distributing valve, a pivoted member engaging the stem of the valve to be controlled, a pivoted contact member having a contact surface formed with a cavity or depression and projecting portions at the ends of the cavity, the said contact member having an arm adapted to engage the first mentioned pivoted member to move the valve to open the same, and a distributing shaft provided with a cam, of a supporting member having a housing projecting therefrom, a reciprocating member adapted to reciprocate in said housing and acted upon by the said cam, and a spring for holding the said contact member with its contact surface in engagement with the end of the reciprocating member, the said supporting member being adjustable around the distributing shaft, to cause the reciprocating member to engage different portions of the said contact surface.

5. In a device of the character described, the combination with a valve, of means for actuating the valve including a pivotally mounted member formed with a power-engaging arm, a reciprocating member designed to engage said power-engaging arm for moving the same, a pivotally mounted housing carrying said reciprocating member, means for adjusting the position of said housing whereby said reciprocating member is caused to engage said power-engaging arm at different points, and a cam for moving said reciprocating member, said cam moving said reciprocating member an equal distance at each movement thereof and causing different movements of said cam according to the point at which the reciprocating member engages said power-engaging arm.

In witness whereof, I have hereunto signed my name in the presence of two subscribing witnesses.

PAOLO KIND.

Witnesses:
JOCELYN GOUBEYRAN,
JOHN BAZETTA.

Copies of this patent may be obtained for five cents each, by addressing the "Commissioner of Patents, Washington, D. C."